Figure 1:
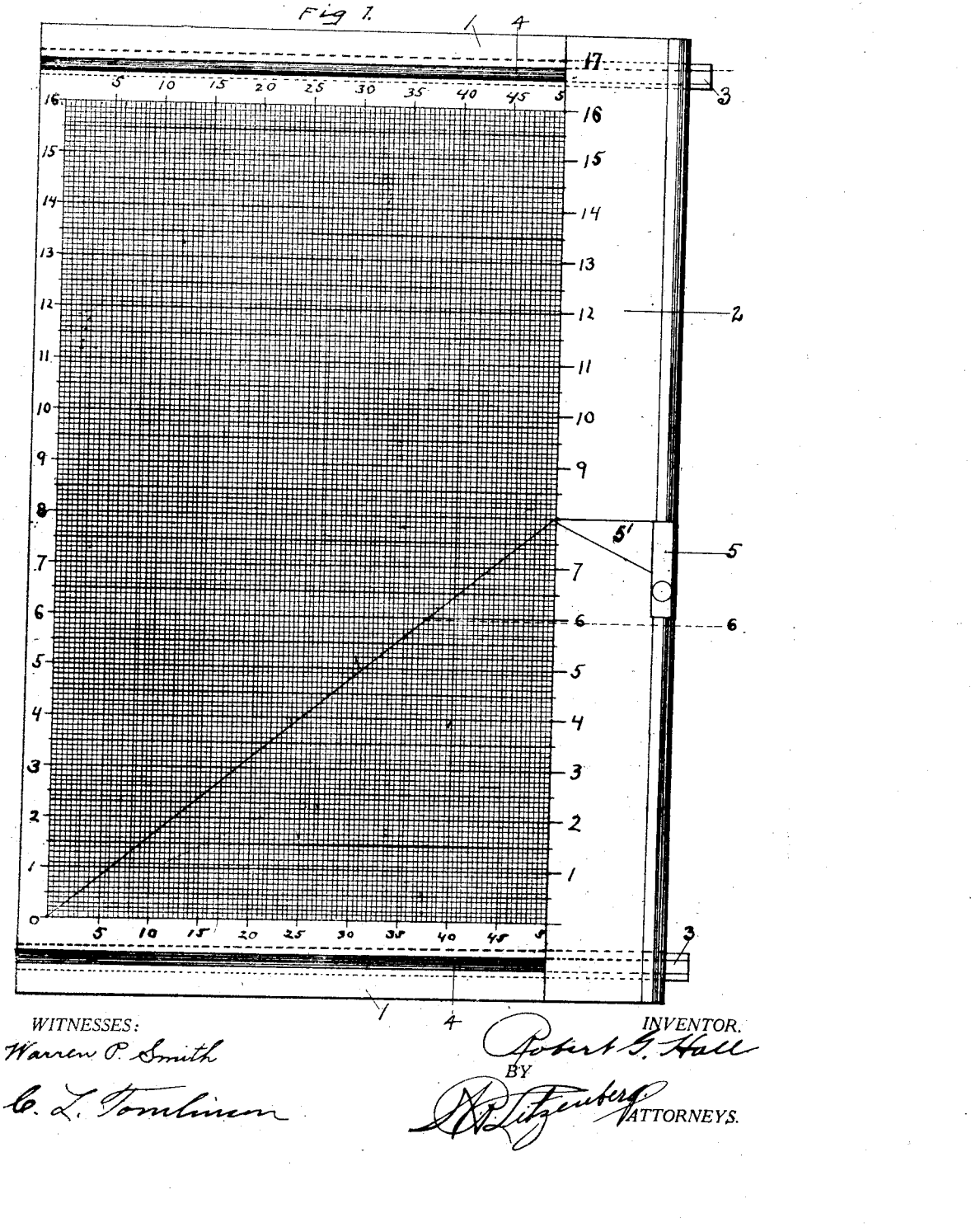

R. G. HALL.
PROPORTION CALCULATOR.
APPLICATION FILED JUNE 12, 1914.

1,195,212.

Patented Aug. 22, 1916.
2 SHEETS—SHEET 1.

WITNESSES:
Warren P. Smith
C. L. Tomlinson

INVENTOR.
Robert G. Hall
BY
ATTORNEYS.

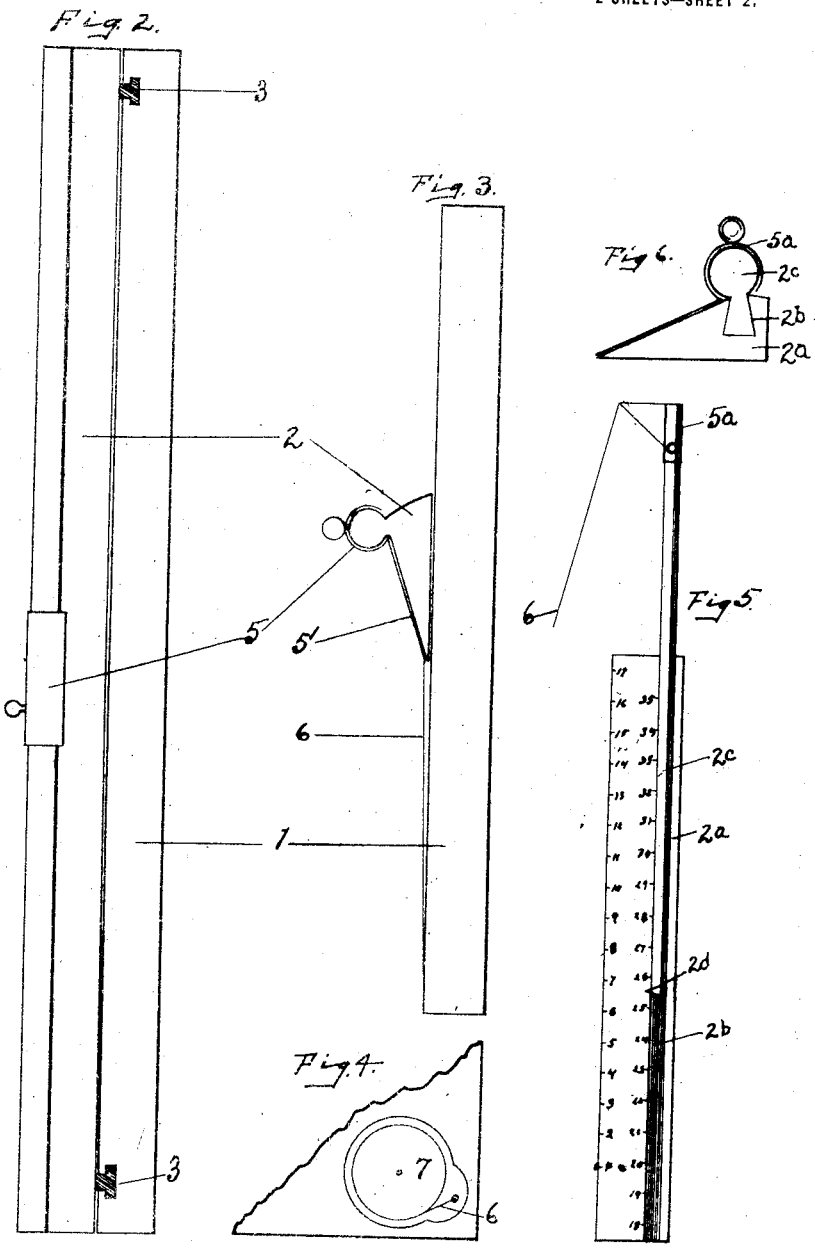

UNITED STATES PATENT OFFICE.

ROBERT G. HALL, OF PORTLAND, OREGON.

PROPORTION-CALCULATOR.

1,195,212.   Specification of Letters Patent.   Patented Aug. 22, 1916.

Application filed June 12, 1914. Serial No. 844,737.

*To all whom it may concern:*

Be it known that I, ROBERT G. HALL, a citizen of the United States, residing in the city of Portland, county of Multnomah, and State of Oregon, have invented certain new and useful Improvements in Proportion-Calculators, of which the following is a complete specification.

My invention relates to a proportion calculator, and more particularly to a device adapted to quickly and accurately indicate in a graphic manner, any desired proportion or ratio within its capacity.

Some of the uses to which the invention may be successfully and advantageously put are as follows: To ascertain the unknown amount, percentage, quantity, weight or measurement, constituting the missing term of a proportion, when the other three terms of the proportion are known; or, in other words, by it the missing term of one of two equal ratios may be immediately indicated. If, for example, the total amount of a milk formula is forty ounces and there are seventeen ounces of milk used, and there is 4% of fat in milk, the percentage of fat contributed by the seventeen ounces of milk can be indicated instantly. Centimeters may be changed to inches, and vice versa; kilograms to pounds; the dose of a drug for a child of known weight can be quickly ascertained when the dosage for an adult of average weight is known, and many other uses which need not be here mentioned.

I have shown one practical embodiment of the invention on the accompanying sheets of drawings which I will now describe, in order that others may understand the invention.

In the drawings,—Figure 1 is a face view of a chart embodying my invention; Fig. 2 is a side edge view thereof; Fig. 3 is an end view; Fig. 4 is a fragmentary view of the under side of the chart body, showing a means for taking up and letting out an indicator; Fig. 5 is a top plan view of a modified form of gage device; Fig. 6 is an end view thereof.

Referring to the drawings, the invention comprises a board or base 1, provided on its face with a chart comprising a system of closely spaced parallel rulings intersecting each other at right angles in the manner indicated and numbered successively in groups, as of ten each, the vertical lines, as here shown being numbered by 5's up to 50, and the horizontal groups being numbered successively from 1 to 16, as shown.

Mounted to be moved laterally back and forth across the face of the chart is a rule or member 2; having guide feet 3, at its opposite ends, adapted to slide in the grooves 4—4 in the board 1, as indicated, whereby to keep said rule in perfect alinement with the vertical rulings. This rule is graduated and numbered to correspond with the horizontal groups of chart rulings, 1 to 16.

Slidably mounted upon the rule 2 is a gage 5, having an arm 5' projecting to the edge of the rule, as indicated, and having attached to its end a flexible thread or indicator, 6, which extends to the corner, or zero point of the chart, as shown, where it passes through the board 1, and is wound upon a spring-actuated spool or reel, 7, set in the under side of the board, as indicated in Fig. 4 of the drawings. This indicator or thread is automatically taken up and let out as the gage 5 is moved longitudinally of the rule 2, or as the rule is moved back and forth to different positions over the face of the chart.

In the drawings, Fig. 1, the rule is set at the 50 line on the chart, and the gage 5 is set at the 8 mark on the rule, which also registers with the horizontal line 8 on the chart, the thread or indicator 6 being thereby held so that it intersects the intersection of the lines or rulings 8 and 50 on the chart. Now in use, and as set, 50 is to 8 as any of the numbers of the vertical rulings is to any of the numbers of the horizontal lines or rulings intersected thereby at the thread or indicator. For example, 50:8::25:4, or vice versa, or as 35 is to 5.6. If the gage is set to 4 on the rule, the thread or indicator moves therewith to a position intersecting the intersection of the lines 50 and 4, as will be readily understood. Thus the correct proportion of any number or quantity or percentage, which may be indicated by any of the vertical lines, to any other number, quantity or percentage, which may be indicated by any of the horizontal lines, that is, a number represented by a vertical line is to a number represented by a horizontal line intersecting it at the thread or indicator, as any other vertical line number is to any other horizontal line number whose lines intersect at the thread or indicator. In the example heretofore referred to, if there is 4% of fat in milk, and it is desired to ascertain the percentage of fat in a 40 ounce mixture, in which there are 17 ounces of milk, the rule is set at the 40 vertical line, representing the total amount in ounces, and the gage 5 is set at the 4 horizontal line, indicating the percentage of fat in milk, and it is only necessary then to follow up the 17 vertical line to the thread, which intersects the horizontal line at 1.7, indicating that percentage of fat in the 40 ounce mixture in which there are 17 ounces of milk.

In Figs. 5 and 6, I have shown a modified form of rule to make possible the reduction of the size of the chart. In this form the rule $2^a$ is shown to be only half as long as the rule 2, and is provided with a groove $2^b$ with a sliding extension $2^c$ therein, provided with a pointer, as at $2^d$ at one end, and at its other end, provided with the gage $5^a$. The gage $5^a$ is slidably mounted on the extension and has the thread or indicator attached thereto, as in the other form, and the extension is adjustable longitudinally in the rule, so that when the extension is fully extended, the total length is the same as the other rule 2.

I am aware that many different forms of the invention can be made and that different charts can be prepared, and that the invention can be put to a great many different uses, and I do not, therefore limit the invention to the embodiments here shown for purposes of illustration, or to the uses mentioned, except as I may be limited by the hereto appended claims.

I claim:

1. A device of the character referred to, comprising in combination, a chart having graduated rulings running in opposite directions at right angles to each other across said chart, an indicator attached at both ends and stretched across said chart in intersecting relationship with the graduated rulings thereof, movable means to which one end of said indicator is attached, said movable means being movable in opposite directions from one side of said chart to the other and from one end thereof to the other, and means for keeping said indicator stretched during any adjustment thereof to different angles, said means having a capacity equal to the extreme movements of the movable end of the indicator from one side of the chart to the other, or from one end thereof to the other.

2. A device of the character referred to, comprising in combination, a chart having graduated rulings running in opposite directions at right angles to each other across said chart, an indicator attached at both ends and stretched across said chart in intersecting relationship with the graduated rulings thereof, one end of said indicator having a fixed position relative to said graduated rulings, movable means to which one end of said indicator is attached, said movable means being movable in opposite directions from one side of said chart to the other and from one end thereof to the other, and means for keeping said indicator stretched during any adjustment thereof to different angles, said means having a capacity equal to the extreme movements of the movable end of the indicator from one side of the chart to the other, or from one end thereof to the other.

3. In combination, a chart, a rule or scale member slidably mounted thereon to be moved laterally there-across from one side to the other, a gage member slidably mounted upon said rule or scale member and movable longitudinally thereof, an indicator thread extending from a fixed position on said chart and attached to said gage member, and means for keeping said indicator thread stretched and at the same time permitting it to be moved with said gage member and said rule or scale member to any position over the face of said chart in all directions.

4. A proportion calculator comprising in combination a chart, consisting of graduation marks running in opposite directions, an indicator thread extended from a zero point on said chart across the face thereof and adjustable to the point of intersection of any two of said marks, means for automatically winding up and letting out said indicator thread in its adjustments and an adjustable gage member to which one end of said thread is attached, said adjustable gage member being slidably connected with said chart and movable over the face thereof in all directions for the purpose indicated.

5. A device of the character referred to, comprising in combination, a chart having two series of graduated parallel rulings intersecting each other at right angles, an adjustable member extending across the face of said chart parallel with one set of said rulings, said member being adjustable laterally across said chart from one side thereof to the other, a gage member mounted thereupon and adjustable longitudinally thereof, an indicator thread from said gage member and extended across the face of said chart to a fixed point, and a spring actuated spool for taking up and letting out said thread for adjustments, substantially as shown and described.

Signed at Portland, Multnomah county, Oregon, this 6th day of June, 1914.

ROBERT G. HALL.

In presence of—
R. B. FRENCH,
WARREN P. SMITH.